United States Patent [19]
Dudley

[11] 3,734,618
[45] May 22, 1973

[54] METHOD OF MAKING STEREOSCOPIC PHOTOGRAPHS

[75] Inventor: Leslie Peter Dudley, Los Angeles, Calif.

[73] Assignee: Dudley Optical Laboratories, Inc., Beverly Hills, Calif.

[22] Filed: Aug. 24, 1970

[21] Appl. No.: 66,356

Related U.S. Application Data

[62] Division of Ser. No. 747,931, July 26, 1968.

[52] U.S. Cl. .................................355/132, 95/18 P
[51] Int. Cl. ...........................................G03b 35/00
[58] Field of Search ..........................355/132; 95/18

[56] References Cited

UNITED STATES PATENTS

| | | | |
|---|---|---|---|
| 2,072,396 | 3/1937 | Eggert | 355/132 X |
| 1,987,113 | 1/1935 | Kitroser | 355/33 |
| 3,535,993 | 10/1970 | Jones | 95/18 |
| 1,918,705 | 7/1933 | Ives | 350/131 |
| 1,935,471 | 11/1933 | Kanolt | 95/18 P |
| 2,174,003 | 9/1939 | Ives | 95/18 P |
| 3,503,315 | 3/1970 | Montebello | 95/18 P |

Primary Examiner—John M. Horan
Attorney—Jessup & Beecher

[57] ABSTRACT

Improved methods and systems are provided for producing stereoscopic photographs which exhibit optical characteristics resembling those of a hologram in that a photograph is produced by the methods of the invention the aspect of the recorded three-dimensional image changes with change of viewpoint about both horizontal and vertical axes. The photograph produced in accordance with the methods of the present invention may be appropriately termed an "integram" or an "integraph," and it possesses important advantages over the hologram. For example, coherent light, such as laser illumination, is not required for producing or viewing the photograph, the photographic equipment required to produce the photograph is compact and simple to operate, and exposure times for producing the photograph correspond to those which would be required for ordinary two-dimensional photography under the same conditions.

2 Claims, 17 Drawing Figures

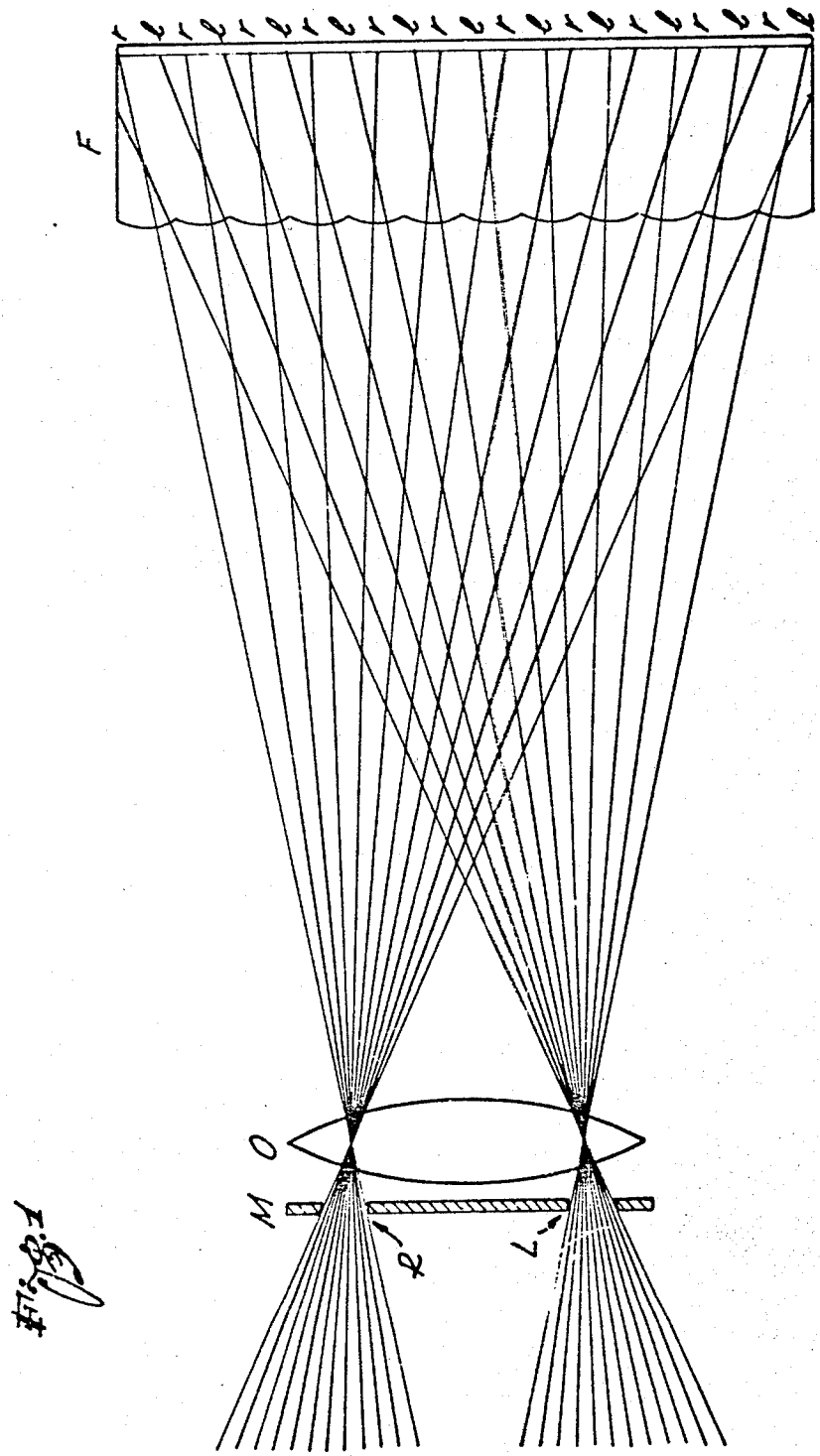

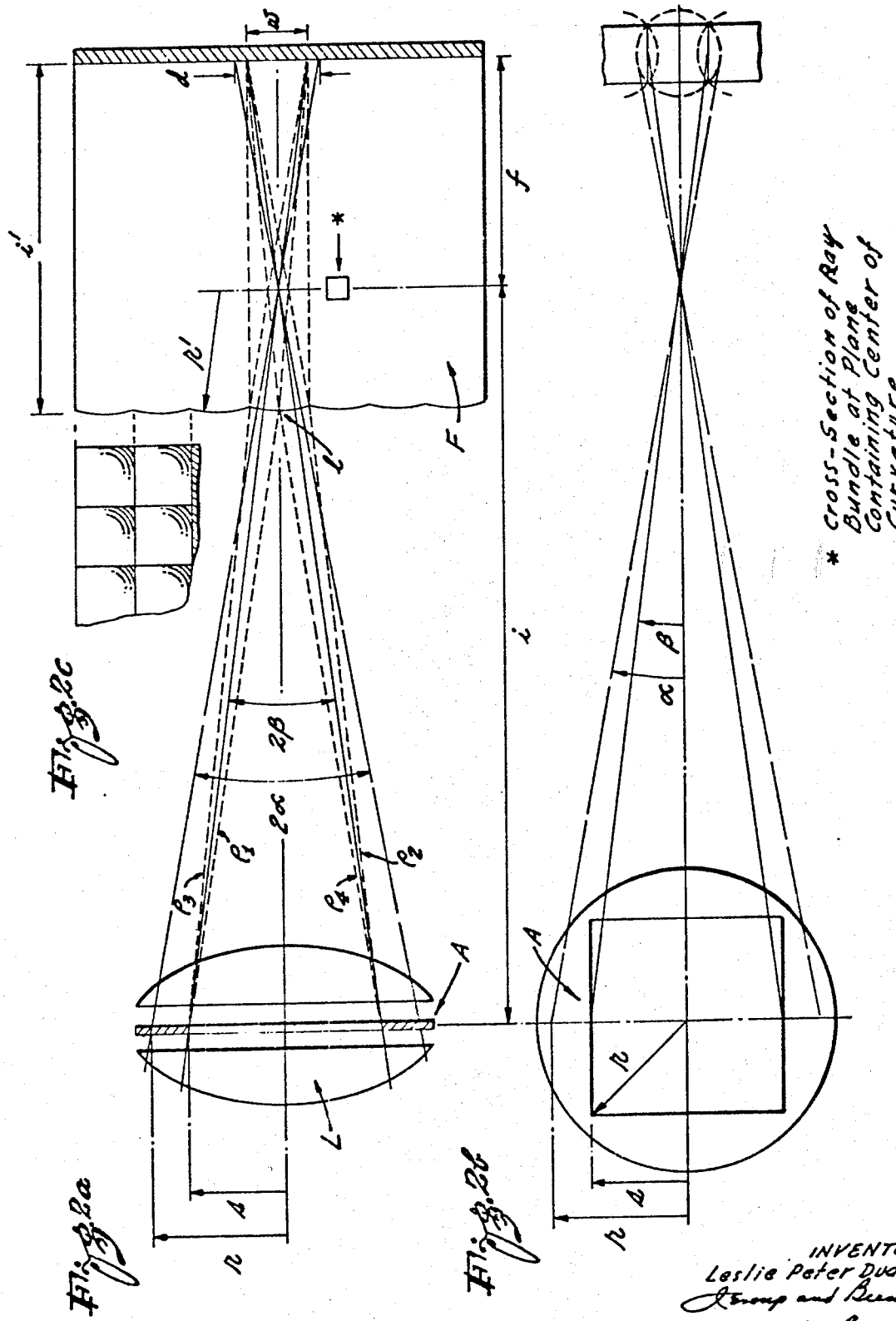

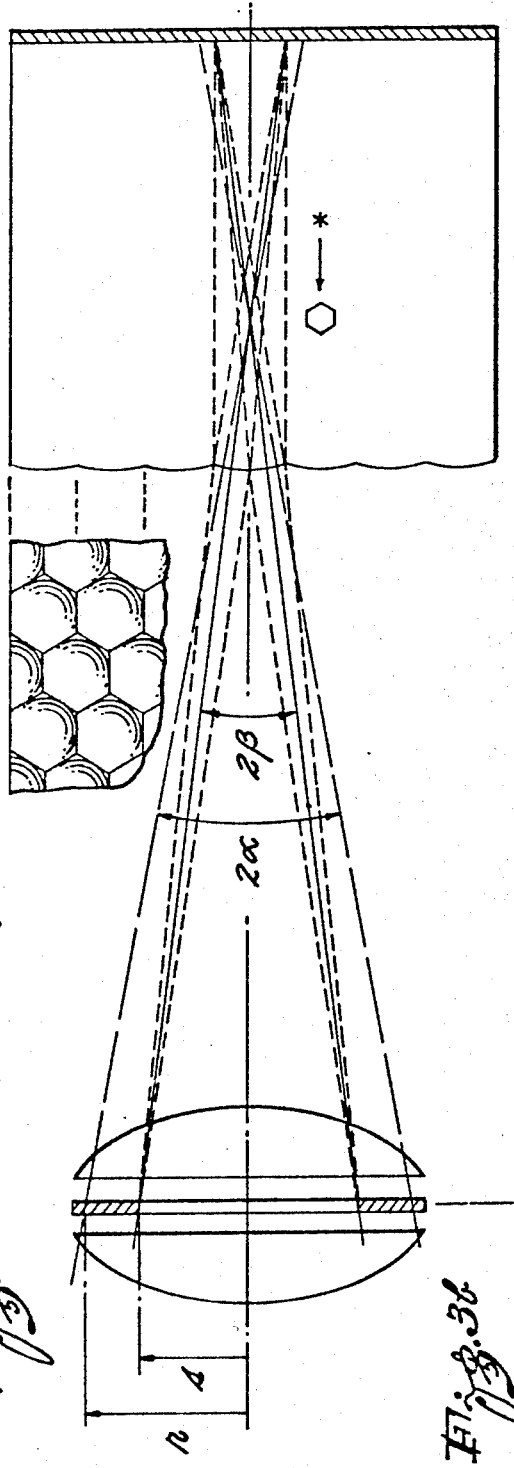
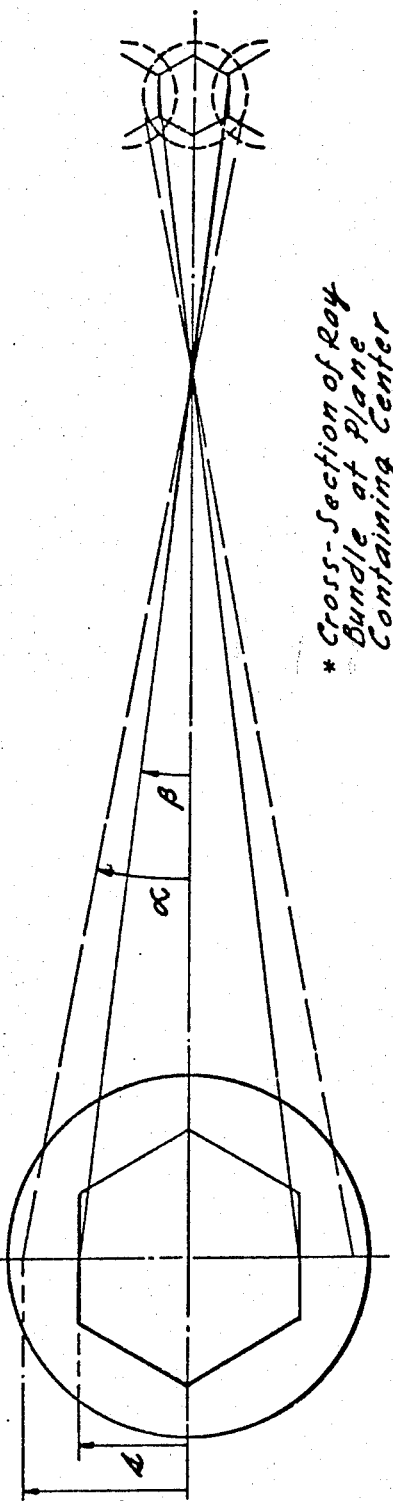
Fig. 3c
Fig. 3a
Fig. 3b
* Cross-Section of Ray Bundle at Plane Containing Center of Curvature
INVENTOR
Leslie Peter Dudley
By Keith D. Beecher
ATTORNEYS

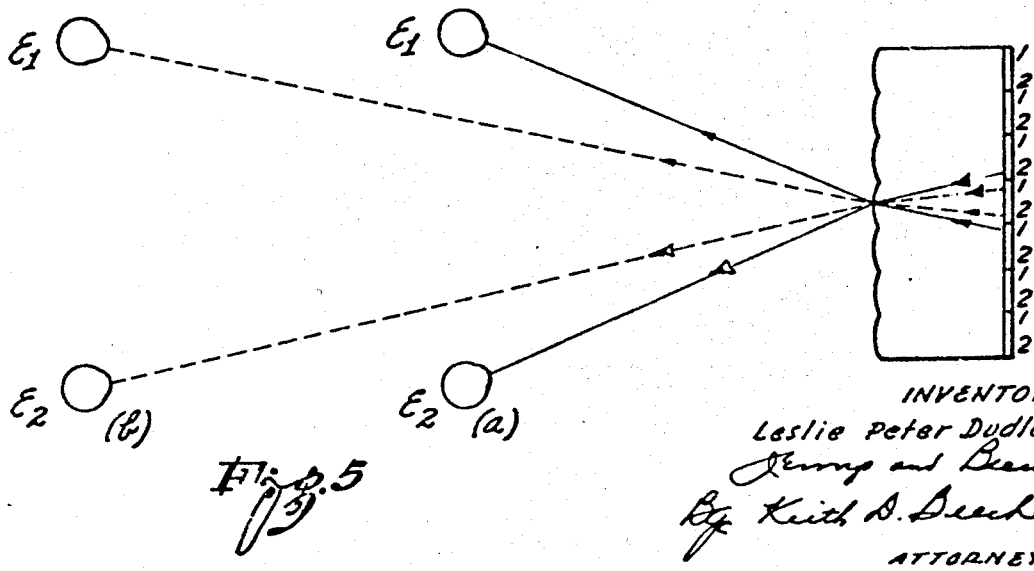

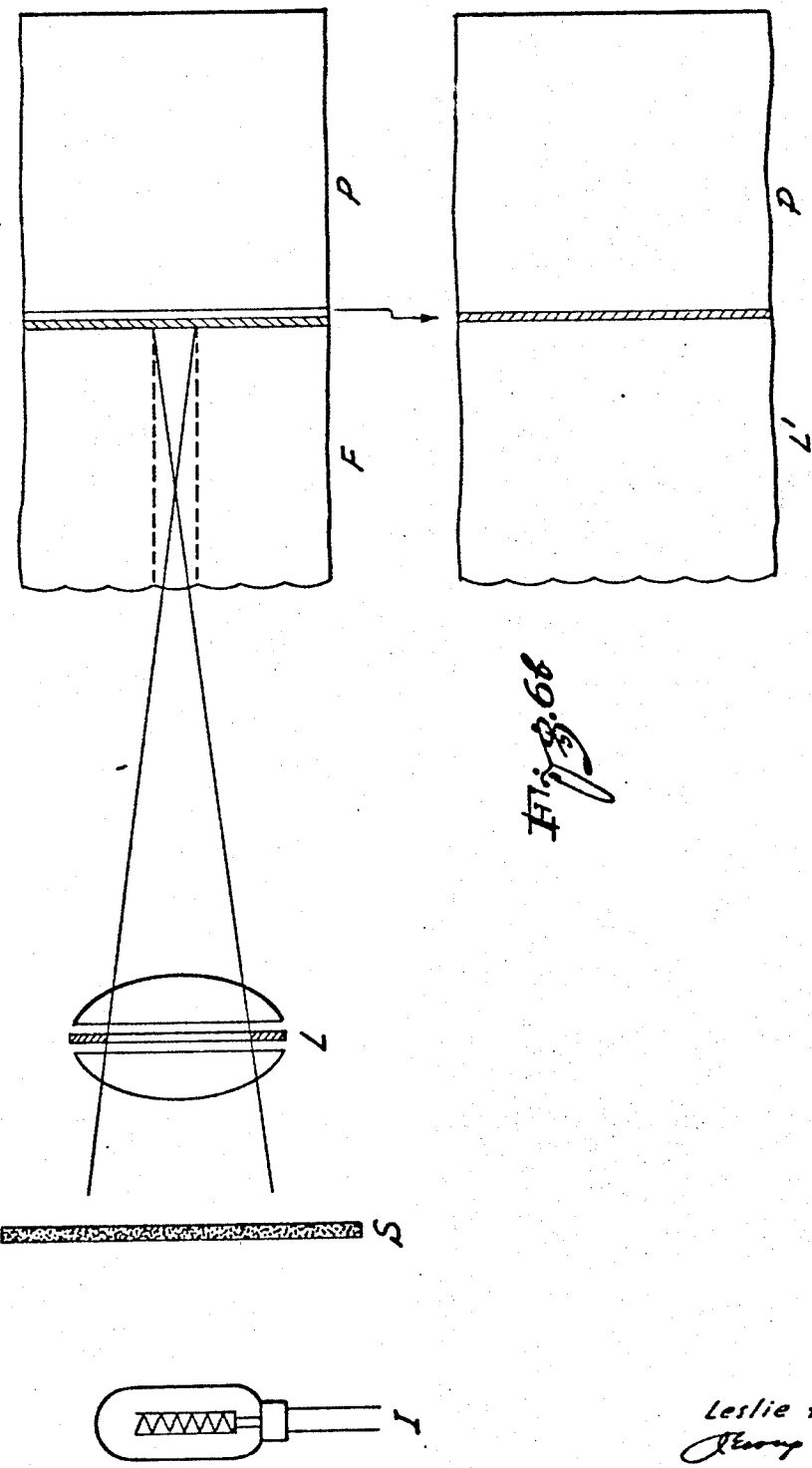

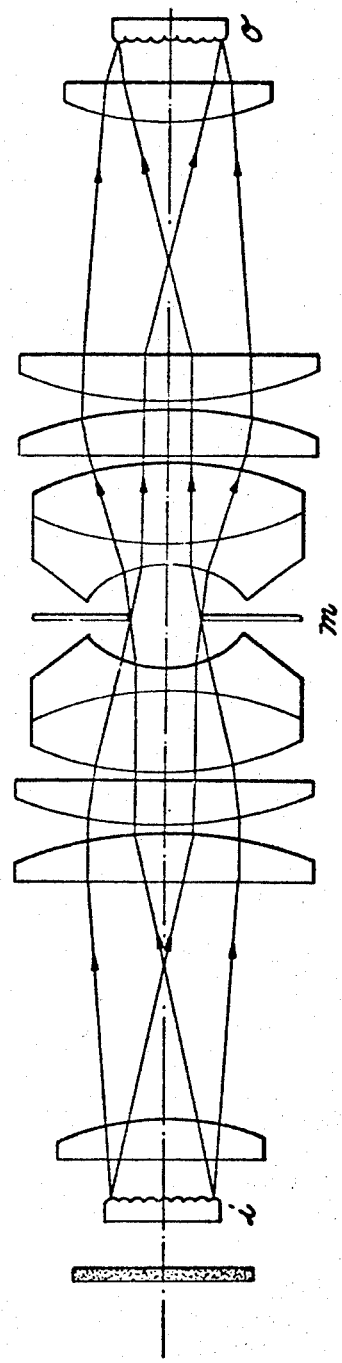
Fig. 7

METHOD OF MAKING STEREOSCOPIC PHOTOGRAPHS

The present application is a division of copending application, Ser. No. 747,931, which was filed July 26, 1968, in the name of the present inventor.

BACKGROUND OF THE INVENTION

An integram type of photograph consists of a large number of minute, juxtaposed images produced by an optical screen. The same, or a similar, screen may be used when viewing the photograph. In a preferred form, the screen consists of transparent material embossed on one surface with an array of small lenticules of spherical or substantially spherical curvature. The screen is so located with respect to the photographic film emulsion or other photo-recording medium that the photo-recording surface of the film is at the focus of the lenticules. A convenient arrangement is for the screen-film combination to be manufactured as a composite unit, the lenticules being formed on the surface of the film base.

In some applications, it is possible to employ, instead of a screen embossed with spherical lenticules, a device which may be regarded as the optical equivalent of such a screen. One type of optically equivalent screen is made from a pair of cylindrically lenticulated screens, the lenticulated surfaces of the two screens being in contact with each other, and the longitudinal axes of the lenticules of one screen being at right-angles to the longitudinal axes of the lenticules of the other screen.

The photograph with which the present invention is concerned is produced by an indirect photographic method such as that described and claimed in the aforesaid copending application, Ser. No. 747,931. The indirect method uses a screen-film combination to record an integram of the image of the scene or subject formed by a primary lens, for example, a camera objective lens. The screen-film combination is located at the focal plane of the camera to which slight modifications have been made. Each lenticule then functions as a minute field lens, reimaging that portion of the image formed by the primary lens which would otherwise reach the film direct. In this indirect method, the degree of parallax is governed by the diameter of the primary lens. No focus adjustment is required for the purpose of insuring sharpness, regardless of the distance of the subject, although the distance of the primary lens from the screen-film combination may be varied if desired. However, such adjustment has no effect on the sharpness of the imagery, but determines which particular transverse plane of the subject will appear to coincide with the film plane of the completed integram.

The reimaging (by the lenticular array) process of the copending application results in a tremendous increase in the depth of field which would otherwise be provided by the primary lens alone. The exposure may be varied by the use of a filter or filters, and/or by the adjustment of the shutter speed. The use of a primary lens of relatively large diameter is desirable, and a number of suitable camera lenses are not currently available on the market. A significant consideration, moreover, is that lenses designed especially for indirect integraphy can be produced at a cost substantially below that of equivalent lenses designed for regular photography. This is because the reimaging process renders it unnecessary to incorporate such precise correction for all the aberrations in the primary lens.

An important feature of the indirect photographic method of the copending application resides in the relationship which must exist between the characteristics of the primary lens, the characteristics of the lenticules, and the dimensions of a special type of aperture plate which is used in conjunction with the primary lens, no iris diaphragm being employed. The reason for this relationship is that it is necessary to insure that adjacent images in the integraphic array are precisely abutting, and not appreciably overlapping or spaced apart.

The aperture plate used in the aforesaid system preferably consists of a mask of opaque material, the center portion of which is pierced to provide a clear aperture, which is quadrilateral or hexagonal in shape, depending upon the shape of the individual lenticules of the lenticular array. In general, the f-number of the primary lens must be numerically lower than that of the lenticules. Then, by appropriate selection of the size of the aperture, the condition specified in the preceding paragraph can be fulfilled.

Integrams produced by the indirect method described above present a predominance of stereoscopic zones when viewed from a comparatively short distance, such as that customarily adopted in normal reading. At greater viewing distances, pseudoscopic zones predominate. This state of affairs may be reversed, if so desired, by adopting a suitable printing technique when making a reproduction from the original photograph, and then the picture will appear predominantly pseudoscopic when viewed from a short distance and predominantly stereoscopic when viewed from a greater distance.

The present invention is particularly concerned with improved methods for making reproductions of photographs produced by the system described by the aforesaid copending application, and to the composition of the photographs themselves.

BRIEF DESCRIPTION OF THE DRAWINGS

FIG. 1 is a diagram showing a portion of a spherically lenticulated film placed at the focus of the camera lens, together with a mask having twin apertures;

FIG. 2A is a diagram, partly in section, showing a portion of a spherically lenticulated film placed at the focus of a camera lens provided with a square aperture;

FIG. 2B is a diagram corresponding to FIG. 2A, the lens, and aperture being viewed on axis;

FIG. 2C is a front view of the lenticular surface, partly broken away, and showing the square peripheries of the lenticules;

FIGS. 3A, 3B and 3C are similar, respectively, to FIGS. 2A, 2B and 2C, except that the lens aperture and the lenticules have hexagonal peripheries;

FIGS. 4A–4F relate to characteristic features peculiar to optical imaging processes involving the use of spherically lenticulated screens or film;

FIG. 5 is a diagram illustrating the effect of the twofold image-inversion resulting from the joint action of the primary lens and the spherical lenticules;

FIG. 6A is a diagram showing a method of making contact prints;

FIG. 6B shows a lenticular screen laminated to the surface of the contact print formed by the method of FIG. 6A; and FIG. 7 is a diagram showing a method of making prints, at unit magnification, in the form of transparencies.

DETAILED DESCRIPTION OF THE ILLUSTRATED EMBODIMENTS

Referring first to FIG. 1, this diagram is intended for use in explanation of certain optical characteristics of the indirect stereoscopic photographic system described and claimed in the aforesaid copending application. The diagram shows a piece of spherically lenticulated film F placed at the focus of a camera lens O. The lens is assumed to have a large effective diameter, preferably greater than the normal interocular distance of about 2 ½ inches. An opaque mask M is located close to the lens, this mask being pierced with a pair of small, laterally spaced circular apertures L and R, the separation between the apertures being approximately equal to the normal interocular distance. As a result of the illustrated arrangement, the small portions of the lens which receive light entering through the two apertures function similarly to two separate lenses. Thus, a "left-eye" view of the subject is directed toward the film by one element and a "right-eye" view is so directed by the other element. The lenticules on the film reimage these two views as a large number of minute, disc-shaped images. Each such disc, occupying but a fraction of the area of emulsion behind the associated lenticule, contains a minute image of some small element of the subject. The "left-eye" and "right-eye" images are interdigitated laterally across the film emulsion as denoted in the diagram by, respective, l and r.

Consider the mask M to be pierced with a third small aperture located midway between the apertures L and R. This will result in the formation of a third array of little disc images, interdigitated between those denoted l and r. It will be clear that the third view constituted by this additional array of images will represent an aspect of the subject which is rightward with respect to that due to the aperture L, and leftward with respect to that due to the aperture R.

Next, consider the mask M to be pierced with further small apertures at intervals extending, not only across the horizontal dimension of the mask, but also along the vertical dimension (i.e., the dimension normal to the plane of the diagram). Each such aperture will result in the information of a further array of image elements displaced from their neighbors by amounts, and in directions, dependent upon the location of the aperture in the mask M.

Now consider, finally, that the mask M is entirely removed, this being equivalent to introducing a sufficiently large number of overlapping apertures. The image formed behind each lenticule will now be a small disc-shaped image of an element of the subject, the aspect of that element which is presented by the disc image changing progressively along every axis in the plane of the disc. According to the values chosen for the optical components of the system, matters can be so adjusted that the little disc images are either spaced apart, just abutting, or overlapping; under any of these conditions, moire effects will be exhibited by the completed picture. In order that such moire effects may be avoided, or at least reduced to a level at which they are not obtrusive, it is necessary to arrange matters so that adjacent elementary images in the array of which the picture is composed are precisely abutting, and not appreciably overlapping or spaced apart; moreover, it is desirable that the entire area of the photosensitive surface within the film format shall undergo exposure, but not multiple exposure. It will be evident that it is impossible for all these conditions to be fulfilled if the elementary images are disc-shaped. Thus, for example, with disc-shaped images, matters can be so adjusted that each disc just contacts the periphery of each of the adjacent discs. However, such contact is possible at only certain points on the periphery of each disc, thus leaving a multiplicity of unexposed areas.

A feature of the system described in the copending application is to provide means for modifying the shape of the elementary images so that the conditions necessary for obviation or minimization of moire effects can be achieved. One of the preferred methods involves the use of a plate or diaphragm having a square aperture as shown schematically in FIGS. 2A and 2B. The effect of this aperture plate, used in conjunction with lenticules having square peripheries, is to change the shape of the elementary images from circular to square, and to provide that the sides of adjacent squares are precisely abutting, and neither overlapping nor spaced apart. It is possible, at least in theory, to fulfill the required conditions by the use of elementary images having a shape other than square or hexagonal, but departure from the preferred shapes introduces problems in the manufacture of the lenticular screen and in other areas without yielding any additional advantage to offset these difficulties.

FIGS. 3A, 3B and 3C are diagrams similar to FIGS. 2A, 2B and 2C, respectively, but the apertures and lenticules have hexagonal peripheries. Both sets of diagrams will be considered in more detail subsequently herein.

The series of six diagrams in FIGS. 4A–4F will facilitate an understanding of certain characteristic features peculiar to optical imaging processes involving the use of spherically lenticulated screens or film.

Consider, first, FIG. 4A, which diagram represents a square object or target subdivided into four smaller squares bearing the numerals 1, 2, 3 and 4. If imaged by a regular camera lens, the orientation of the numerals, as viewed from the back of the camera, will be as indicated in FIG. 4B. If the image is recorded on a photographic plate or film, a print can, of course, be made; this print, after rotation through 180° in the image plane, will display the numerals in the same orientation as that of the numerals on the target. This print is represented by FIG. 4C, which diagram is identical to FIG. 4A.

Now consider FIGS. 4D and 4F, the target being represented by FIG. 4D. The remaining two diagrams illustrate the results of imaging the target by the method described below. Consider four adjacent spherical lenticules, in square array, on a piece of film or a screen used in conjunction with an imaging system of the type shown in FIGS. 2A and 2B. The image formed at the focal plane of an individual lenticule is not an image of the entire scene within the field of the primary (camera) lens; it is an image of some minute portion of that scene, which particular portion being dependent upon the location of the lenticule within the camera format. Accordingly, it is to be assumed in the present case that FIG. 4D represents just a very small portion of a much larger target, the portion illustrated being of such dimensions that its image precisely fills the area of the total format of the four-lenticule array. Now, in the absence of the lenticules, the image would be oriented as shown in FIG. 4B. However, due to the presence of the lenticules, the elementary image within the format of each individual lenticule undergoes rotation about its center through 180°; accordingly, the orientation becomes as shown in FIG. 4E.

In order that the complete picture (of which FIG. 4E, as previously indicated, represents just a small part), in the form of either the original or a print may be viewed the right way up, it is necessary for the complete picture to be rotated through 180°. This further rotation results, finally, in the orientation represented in FIG. 4F. Thus, the picture as a whole is now the right way up, element No. 1 being above element No. 3 and to the left of element No. 2, while element No. 4 is below element No. 2. However, each individual element is now inverted; in consequence of this inversion, the panoramic effects exhibited by pictures produced by this technique are the opposite of those experienced when viewing an actual three-dimensional subject or scene.

Thus, when viewing an actual scene, if the observer moves his head to the left, a more leftward aspect of the scene is presented to his eyes; if he moves his head to the right, then the view presented to his eyes is more rightward in aspect. Again, when viewing a real-life scene, if the observer raises his head, the aspect of the scene presented to his eyes changes to one appropriate to his more elevated viewpoint. Similarly, if he lowers his head, the aspect changes to one appropriate to his lower viewpoint. However, in the case of a picture produced by the method under discussion, the changes in aspect which result from changes in the observer's viewpoint are the opposite of those just indicated. If, for example, the observer moves his head in a lateral direction, then the aspect of the image presented to his eyes becomes more rightward if he moves his head to the left, or more leftward if he moves his head to the right. Similarly, if the observer moves his head in a vertical direction, the aspect changes to one appropriate to a lower viewpoint if he raises his head, or to one appropriate to a higher viewpoint if he lowers his head.

It is found, in practice, that the anomalous effects referred to above are not at all disconcerting to the observer; in fact, they will usually pass completely unnoticed by him unless his attention is drawn to them by someone who is familiar with the optical characteristics of the process. There are, moreover, methods — generally involving sequential printing or reproduction — by which these anomalies can be avoided so that the panoramic effects are consistent with those observed in everyday visual experience. These methods involve rotation of the individual picture elements, instead of the array as a whole, through 180° in the image plane.

It might, perhaps, be thought that inversion of the individual image elements, as represented in FIG. 4F, would result in impairment of the quality of the picture. However, in general, such is not the case for the following reason. In most practical cases the image elements are so small that the information within the area of a single element is insufficient for identification as a feature of the picture. Such identification is made possible, however, by the eye's ability to recognize the larger amount of information contained within the net area of several adjacent elements.

FIG. 5 illustrates, in a simplified manner, the effect of the two-fold image-inversion resulting from the joint action of the primary lens and the spherical lenticules; that is to say, the diagram shows why a contact print, a reversal positive or a negative produced in accordance with the methods of the present invention may be seen either stereoscopically or pseudoscopically, depending upon the observer's viewing distance. A piece of spherically lenticulated film is shown in FIG. 5 as being viewed by an observer, first from a position (a), and then from a more distant position (b). In each instance the observer's left and right eyes, respectively, are denoted by $E_1$ and $E_2$. At the focal plane of each lenticule, the numerals 1 and 2 are used to denote the edges of the elementary image depicting, respectively the extreme leftward and extreme rightward aspects of that image.

Thus, for the picture to be seen in the stereoscopic mode, light rays emanating from points in the elementary images nearer to the edges denoted by the numeral 1 should reach the observer's left eye; similarly, rays emanating from points nearer to the edges denoted by the numeral 2 should reach his right eye. Consideration of the diagram will show that, due to the refractive effect of the lenticules, this condition is fulfilled when the observer is at a location such as that denoted by (a). When, however, he moves to a more distant location, such as that denoted by (b), the opposite condition prevails, with the result that the picture is seen in the pseudoscopic mode.

Consider that the picture has been so recorded or reproduced that the little numerals 1 and 2 in FIG. 5, respectively, denote the extreme rightward and leftward (instead of vice versa) aspects of the elementary images. This can be accomplished by means of the transposition process described in the applicant's copending U.S. Pat. application, Ser. No. 747,996, entitled "Improvements in Integral PHotography." Clearly, the situation will now be such that the picture is seen pseudoscopically from relatively near viewpoints, such as (a), and stereoscopically from more distant viewpoints, such as (b).

Reverting to FIG. 2A, L denotes the primary or camera lens, and F denotes a piece of spherically lenticulated film on which the subject or scene is recorded. The lens L is provided with an aperture plate A which must be located in the plane of one of the lens pupils. In the illustration, the aperture plate is represented as being between the front and back components of the lens in the position normally occupied by the iris diaphragm, this being generally the most suitable location. The aperture plate is shown in sectional side elevation in FIG. 2A, and in front (or rear) elevation in FIG. 2B. The aperture itself is square.

The dimension $i$ is the effective focal distance of the lens L from the film F; thus, this distance exceeds the focal length of the lens except in some special cases (e.g., high altitude aerial photography) in which the lens is focused at infinity. In view of the fact that the thickness of the film is insignificant compared to the distance $i$, it is of little consequence whether the latter dimension be measured from the lens to the lenticules, to the film emulsion, or to some intermediate plane. For the present purpose it is most convenient for the distance $i$ to be, as indicated in the diagram, that from the lens to the plane containing the centers of curvature of the lenticules.

The symbol f denotes the focal length of the lenticules; $i'$ is the distance of the summit of each lenticule from the photosensitive surface; $r'$ is the radius of curvature of the lenticules, and w is the width of each lenticule or the lenticular pitch distance. In addition, $2\beta$ denotes the acceptance angle of the lenticules, and $2\alpha$ is the effective f-cone angle of the lens L which would be available if the aperture plate A were to be replaced by a regular, circular stop or iris diaphragm. For the most economic design of the complete system, it is preferable that this f-cone angle be that corresponding to the maximum aperture at which the lens is designed to operate. The radius of the circular aperture is denoted by r, and the half-length of a side of the square aperture by which the circular aperture is replaced is denoted by s.

With the circular aperture in position, the imagery formed at the focus of each lenticule would occupy a circular area having a diameter d (see FIG. 2A) in excess of the pitch distance or lenticule width w. Hence, the recorded picture would be composed of a multiplicity of little overlapping discs, and would consequently exhibit intolerable moire effects when viewed through the lenticulated surface. If the diameter of the circular aperture were to be reduced so that the effective f-cone angle of the primary lens is equal to the acceptance angle of the lenticules, then:

$$\alpha = \beta, \text{ and } d = w$$

Under these conditions, the picture would still be composed of a multiplicity of elementary disc-shaped images, but the peripheries of adjacent discs would then be just in contact, and neither appreciably overlapping nor spaced apart. In consequence, each little image disc would be surrounded by four star-shaped areas of unexposed emulsion, this resulting in a poorly resolved picture; further, the pattern formed by the little star-shaped areas would cause intolerable moire effects. If the diameter of the circular aperture were to be still further reduced so that:

$$\alpha < \beta, \text{ and } d < w$$

this condition would be made even worse, the image discs becoming smaller and the star-shaped areas becoming larger.

The solution of the above problem constitutes an important feature of the invention described and claimed in the aforesaid copending application, and FIGS. 2A and 2B are to be regarded as representative of the means by which the desired end can be attained. It is to be imagined that the lenticules on the film F have square peripheries, each bounding an area $w \times w$, their shape thus matching, to a reduced scale, that of the square aperture in the plate A. Accordingly, the exposed area at the focus of each lenticule will be square-shaped instead of disc-shaped; it is required that the dimensions of each of these elementary areas shall be substantially equal to $w \times w$.

Consideration of the diagram shows that this condition will be met if the pencil of rays incident on the lenticule $l$ is appropriately restricted; thus, instead of the pencil containing all the rays within the effective f-cone, the vertex angle of which is $2\alpha$ and the base radius of which is r, it must contain only those rays within the pyramid the opposite faces of which include the lenticule acceptance angle $2\beta$, and which has a square base with sides having a half-length s. In order to achieve the most economic design for the system, the value of r should be the minimum that permits this to be accomplished. The modified pencil will then contain those rays comprising the inscribed pyramid of the f-cone. FIGS. 2A and 2B depict this ideal situation. The mathematical relationships are:

effective f-cone angle, $2\alpha = 2 \tan^{-1} r/i$
acceptance angle of lenticules, $2\beta = 2 \tan^{-1} s/i$
and radius of lens aperture, $r \geq 1.4142 s$ The last of these three expressions is derived from the fact that, in the ideal or limiting situation referred to above, the length of the semi-diagonal of the pyramid base is equal to the radius of the base of the cone.

It is to be noted that the relationships between the properties of the primary lens, the aperture plate and the lenticules are established without reference to the angular field of the complete photographic system. This is because the angular field of the system is dependent only upon that of the primary lens; this angular field is unaffected by the use of a specially (e.g., square) shaped aperture in place of the more usual iris diaphragm, or by the use of spherically lenticulated film in place of regular, non-lenticulated film. Thus, the acceptance angle of the lenticules determines the angular width of the zones throughout which the completed picture can be viewed stereoscopically, while the field angle of the primary lens determines the angular field subtended by the scene recorded.

It is important to note that the use of aperture plate A in conjunction with the lens L does not in any way restrict or reduce the area of the lenticulated surface upon which light is incident; even if the size of the aperture were to be reduced to that of a pinhole, light from that pinhole would still reach every part of the surface of every lenticule. In the case of any lens, there is only one "perfect" or "ideal" f-cone, that is, the f-cone the vertex of which lies on the optical axis. However, the image at the focal plane is formed by light rays constituting an indefinitely large number of oblique cones, the vertex angle of each such cone being a little less than that of the f-cone by an amount dependent upon the distance of its vertex from the optical axis. Similarly, with the aperture plate A in FIGS. 2A and 2B in use, there is only one perfect "f-pyramid," this being the inscribed pyramid of the perfect f-cone. Consequently, this f-pyramid is the only one the opposite faces of which subtend an angle precisely equal to that denoted in the drawing by $2\beta$, and which illumines the central region of the lenticule $l$. The entire surface of the lenticule is, however, illuminated by light rays constituting other, almost identical pyramids.

Thus, for example, the rays $\rho_1$ and $\rho_2$, also incident on that lenticule, include an angle almost exactly equal to $2\beta$. Similarly, the angle included between the rays $\rho_3$ and $\rho_4$ is, again, almost exactly equal to $2\beta$. Owing to the refractive action of the lenticule, the pyramid of light defined by the outer pair of rays $\rho_2$ and $\rho_3$ converges to attain minimum cross-sectional dimensions at the plane containing the center of curvature. Therefore, if the film were to be sectioned transversely at this plane, a minute square of light would be seen, the width of the square being equal, to a close approximation, to one-third the width of the lenticule. From this plane the rays diverge, coming to a focus at the emulsion surface, forming thereon a square image the width of which is equal to the width of the lenticule.

In designing a photographic system of the type under discussion, it is generally sufficient to base calculations only on the perfect f-cone and the inscribed pyramid. It is very important, nevertheless, to be aware of the existence of the multiplicity of oblique pyramids of rays which illumine the entire surface of the lenticular array; disregard of these rays has led, in the past, to misconceptions concerning the configurations of the lenticules which can be employed. Thus, the use of spherical lenticules having circular peripheries, as has been proposed in the past, is entirely unacceptable.

FIGS. 3A, 3B and 3C, as mentioned earlier, are similar to FIGS. 2A, 2B and 2C, but show the use of lenticules with hexagonal peripheries in conjunction with an aperture plate having the necessary, corresponding hexgonal aperture. With the hexagonal aperture, the relationship between $r$ and $s$ is the same as in the case of a square aperture, that is to say, we must have $r \geq 1.4142 s$; this follows from the fact that the aperture in FIGS. 3A and 3B represents the inscribed hexagon of the square aperture in FIGS. 2A and 2B.

FIG. 6A shows schematically a method of making contact prints in accordance with the teaching of the invention, of either the transparent or opaque type, from pictures recorded by the means depicted in FIGS. 2A or 3A. For the purpose of explanation, it will be assumed that the optical arrangement used for recording the pictures is that shown in FIG. 2A. As shown in FIG. 6A, a source of illumination I located behind a diffusing screen S is used to fill the field of the lens L with evenly diffused light. The lens L is the same as, or equivalent to, the lens in FIG. 2A. As in the case of the lens in the earlier diagram, the lens L is provided with an aperture plate or diaphragm having a square aperture; the dimensions of this aperture are so correlated with the other parameters of the optical system that each spherical lenticule on the film F forms a minute, square image of the aperture on the film emulsion. Thus, the film emulsion is illumined by an array of square patches of light, adjacent patches being closely abutting, and neither appreciably overlapping nor spaced apart.

It is to be imagined that the film emulsion carries a picture, duly processed, recorded by the method shown in FIG. 2A, and that the thickness and (or) other characteristics of the film are such that the material has undergone no perceptible distortion during processing. The sheet or strip of photosensitive material on which the print or reproduction is being made is shown at P in FIG. 6A. If this reproduction is to be in the form of a transparency, the film or other photosensitive material used should, as in the case of the film F, possess such characteristics that it does not undergo perceptible distortion as a result of processing. If the reproduction is to be in the form of an opaque print, such distortion can be obviated very conveniently by using, for the material at P, emulsion-coated metal (e.g., aluminum) foil instead of the more usual emulsion-coated paper.

As will be noted from FIG. 6A, the material at P is not lenticulated, the emulsion surface being in direct contact with the emulsion surface of the film at F. After the exposure has been made and processing has been completed, a lenticular screen L' (see FIG. 6B) is laminated to the emulsion surface of the print P.

In general, the optical characteristics of the screen L' are the same as those of the lenticular film F. However, this is not an essential requirement; the essential requirement is that the pitch distance between the lenti-cules (about all axes) on the screen L' shall be the same as the pitch distance between the lenticules on the film F. Provided that this condition is fulfilled and that the screen is correctly aligned with respect to the print, no undesirable moire effects will result.

Insofar as the other characteristics of the lenticular arrays are concerned, it is permissible, and sometimes desirable, for the optical properties of the lenticules on the screen to differ from those on the film. For example, by increasing the acceptance angle of the lenticules on the screen compared to that of the lenticules on the film, the angular width of the viewing zones throughout which the print can be seen stereoscopically is increased, although, at the same time, the magnitude of the stereoscopic effect is reduced. Conversely, by reducing the acceptance angle of the lenticules on the screen compared to that of the lenticules on the film, the angular width of the stereoscopic viewing zones is reduced while the magnitude of the stereoscopic effect is increased.

Use of the lens L and square aperture, as described above, is not absolutely necessary, as prints can be made with the air of other methods of illumination. The above described method, however, tends to produce prints of higher quality by minimizing undesirable scattering and diffusion of light within the film base which would otherwise be caused by the lenticulated nature of the surface through which the printing light must enter the film.

FIG. 7 is a schematic diagram showing a method of making prints, at 1:1 or unit magnification, in the form of transparencies, spherically lenticulated film being used for both the input material $i$ and output material $o$. The general arrangement of the printer shown in FIG. 7 is that of a known type of symmetrical telecentric system. However, in order to adapt the arrangement for use in connection with the present invention, the mask or aperture plate $m$ which is customarily inserted between the two halves of the system must be of a special nature. That is to say, the shape and size of the aperture should be appropriately correlated with the optical arrangement used for recording the input imagery. Thus, for example, if the input imagery is recorded by the method shown in FIG. 2A, the camera lens being provided with a diaphragm having a square aperture, then the mask $m$ in FIG. 7 should likewise be provided with a square aperture of such dimensions that each of the elementary images of that aperture formed on the emulsions of the films $i$ and $o$ occupies an area corresponding to the format of a single lenticule. It is preferable, for obvious reasons, for the size of the aperture in the mask $m$ to be adjustable.

Although particular embodiments of the methods and systems of the present invention are discussed above, it is apparent that modifications may be made. It is intended to cover all modifications which fall within the scope of the invention in the following claims.

What is claimed is:

1. A method of making copies on the emulsion surface of a photographic material from photographs of a type comprising a transparent support having a number of small, similarly shaped, juxtaposed pictorial elements oriented in a space-filling array on said support, attainment of said space-filling orientation being accomplished by providing said pictorial elements with a square or hexagonal peripheral shape such that there are no significant spaces between adjacent elements and there is no significant overlapping of adjacent elements, and by providing a lenticular screen comprising an array of lenticules having substantially spherical curvature and having a square or hexagonal peripheral shape corresponding with that of the pictorial elements, the orientation of the screen lenticules also corresponding with that of the pictorial elements, and there being no significant spaces between the peripheries of adjacent screen lenticules; said method comprising the following steps:

placing the emulsion surface of the transparent support of the original transparent photograph in contact with the emulsion surface of the photographic material on which the copy is to be made;

admitting printing light through the spherically lenticulated surface of the aforesaid transparent photograph;

processing a resulting copy photograph; and applying the spherically lenticulated screen to the emulsion surface of the resulting copy photograph.

2. The method set forth in claim 1, in which the printing light is transmitted to the lenticulated surface of the original transparent photograph by way of an optical system comprising a lens and aperture plate having the same optical characteristics as the lens and aperture plate used in recording the original photograph.

* * * * *